United States Patent [19]
Oblander et al.

[11] Patent Number: 5,494,633
[45] Date of Patent: Feb. 27, 1996

[54] METHOD OF MANUFACTURING A POLYURETHANE WEAR RING

[76] Inventors: M. Duane Oblander, 20410 W. 54 Hwy.; Gregory F. Menges, 1659 S. 111th St. W., both of Goddard, Kans. 67052

[21] Appl. No.: 221,944

[22] Filed: Apr. 1, 1994

Related U.S. Application Data

[62] Division of Ser. No. 237,179, Aug. 29, 1988, Pat. No. 5,324,560.

[51] Int. Cl.⁶ .................... B29C 39/02; B29L 31/26
[52] U.S. Cl. .................... 264/236; 264/28; 264/294; 264/325; 264/DIG. 65; 264/331.19
[58] Field of Search .................... 264/28, 236, 237, 264/294, 321, 325, 326, 347, 348, 331.19, DIG. 65; 277/12, DIG. 6; 428/65, 423.1

[56] References Cited

U.S. PATENT DOCUMENTS

| | | | |
|---|---|---|---|
| 2,231,769 | 2/1941 | Merrill | 264/236 |
| 2,549,144 | 4/1951 | Truscott | 264/294 |
| 2,741,800 | 4/1956 | Brockway | 264/236 |
| 3,246,065 | 4/1966 | Way | 264/294 |
| 3,457,234 | 7/1969 | Gianatasio | 264/236 |
| 3,487,805 | 1/1970 | Satterthwaite et al. | |
| 3,551,536 | 12/1970 | Guerreiro | 264/331.19 |
| 3,605,672 | 9/1971 | Strumbos | |
| 3,756,741 | 9/1973 | Woell, Jr. | |
| 3,899,567 | 8/1975 | Gorman | 264/325 |
| 4,074,652 | 2/1978 | Jackson | |
| 4,198,037 | 4/1980 | Anderson | 264/325 |
| 4,244,908 | 1/1981 | Hirasuma | 264/236 |
| 4,295,787 | 10/1981 | Lardellier | |
| 4,319,790 | 3/1982 | Thomson | |
| 4,526,509 | 7/1985 | Gay, Jr. et al. | |
| 4,583,913 | 4/1986 | Yazaki | |

FOREIGN PATENT DOCUMENTS 7412640  4/1975  Netherlands .

*Primary Examiner*—Mathieu D. Vargot

[57] ABSTRACT

A method of manufacturing a novel liquid cast urethane rubber object that exhibits dimensional stability when subjected to temperature fluctuations including the steps of casting a liquid urethane polymer with curing agent in a heated mold and then subjecting the cast polyurethane part to compression in a second mold while heating (typically above 170° F. and preferably 212° F.) followed by cooling (typically below 40° F. and preferably 32° F.), thus inducing a low temperature set in the final cured product. Such a method is useful to mold a polyurethane object (e.g., a wear ring for marine jet pumps and the like) to exacting tolerances without machining.

6 Claims, 2 Drawing Sheets

METHOD OF MANUFACTURING A POLYURETHANE WEAR RING

This is a divisional of application(s) Ser. No. 07/237,179 filed on 8/29/88, now U.S. Pat. No. 5,824,560.

BACKGROUND OF THE INVENTION

1. Field of the Invention

This invention relates to a method of manufacturing a molded polyurethane product with a permanent set that allows the product to retain dimensional stability during temperature fluctuations. More specifically, the invention relates to the manufacture of a polyurethane wear ring for use in jet pumps or the like that can withstand the temperature cycles associated with such uses.

2. Description of the Prior Art

It is generally known in the art that viscous liquid urethane polymers derived from isocyanate (—NCO) terminated polyesters or polyethers (with or without some branching or chain extension) can be mixed with a cross-linking curing agent (e.g., diamines or the like) and poured into a heated mold such as to cure the cast polyurethane part. It is also generally known that such urethane rubber cast parts can then be removed from the mold and subjected to further heating and post cure cross-linking. Liquid cast urethane rubbers are noted for their high tear strength and abrasion resistance particularly relative to natural rubbers. Extraordinary hysteresis under dynamic stressing can be rationalized as the cause of the desirable wear and abrasion resistance, however, the lack of dimensional stability under temperature cycling (i.e., non-reproducible thermal hysteresis) severely limit the pragmatic use of liquid cast polyurethane components for at least two reasons. First, since the liquid casting, curing and post cure annealing are generally performed at elevated temperatures, the resulting external dimensions of the cast polyurethane part is difficult to predict and control. Thus in the past when high precision in a given dimension is critical, the part would generally have to be machined to tolerance rather than directly cast to the desired dimension. And secondly, even if the cast polyurethane part were machined to proper tolerance, the end application of the resulting urethane rubber would have to be confined to relatively narrow range of temperature for thermal excursion beyond this range would result in a change in the dimension of the urethane rubber part.

For example, it has been suggested in the past that the metal or brass wear ring surrounding the outer perimeter of the impeller of a modern jet pump be replaced with rubber material, however, when attempting to do this, two very specific deficiencies or problems occur. First, in such an application and particularly when the jet pump is intended for high performance drag boat racing, the rubber wear ring must conform to dimensional tolerances measured in terms of a few thousandths of an inch. Prior to the present invention, these close tolerances required the liquid cast polyurethane part to be machined after molding. And second, even after being machined to fit the jet pump housing, the liquid cast polyurethane rubber wear ring, prior to the present invention, would experience dimensional instability, particularly if the part was exposed to the natural temperature variations associated with the summer and winter seasons. The polyurethane wear ring would not return to the original dimensions after experiencing cool weather which in turn would result in the ring becoming loose in the jet pump housing and/or failure of the hydraulic sealing on the outer perimeter of the impeller and associated loss of efficiency of the pump.

In view of the prior art and in particular, the problems associated with precision wear surface applications such as found in the marine jet pump and the like, a need still exists for a method of manufacturing a liquid cast urethane rubber part that can be molded to exacting tolerances, thus alleviating any post molding machining steps and simultaneously exhibits improved dimensional stability over a broader range of operating temperatures. The present invention provides such a process and resulting cast polyurethane part.

SUMMARY OF THE INVENTION

In view of the prior art problems associated with liquid cast polyurethane components, the present invention provides a method of inducing a permanent dimensional set in liquid cast urethane rubber. For purposes of this invention, the expression "permanent dimensional set" is viewed as being a "zero" set in that the liquid cast polyurethane component or part tends to return to a minimum size or dimension when cooled. To induce or create this permanent dimensional set in a liquid cast polyurethane part, the cast part is subjected to a post cure compression at elevated temperature and then rapidly cooled or quenched while still under compression. The dimensions achieved by this low temperature compression set procedure are permanent during subsequent dimensional changes associated with further temperature fluctuations (normal thermal expansion and contraction). In other words, the inducing of a zero set according to the present invention tends to alleviate any problems associated with thermal relaxation or thermal hysteresis previously characteristic of liquid cast polyurethane rubber. Thus, the present invention provides a method of manufacturing a molded polyurethane part exhibiting dimensional stability to temperature fluctuations comprising the steps of:

(a) preparing an admixture of a viscous liquid urethane polymer and a curing agent;

(b) casting the admixture prepared in step(a) into a first preheated mold and maintaining therein until the admixture is cured thus producing a molded polyurethane cast part;

(c) removing the cast part produced in step (b) from the mold and subjecting the cast part to a temperature in excess of about 200° F. for a time sufficient to cure the cast part;

(d) compressing the cast part produced in step (c) in a second mold;

(e) heating the compressed cast part and second mold of step (d) to an elevated temperature for sufficient time to have the cast part thermally equilibrate at at the elevated temperature;

(f) cooling the compressed cast part and second mold produced in step (e) to a low temperature for a time sufficient to induce a permanent set in the cast part; and (g) removing from the second mold a cast polyurethane part that exhibits improved dimensional stability during repeated temperature fluctuations.

It is an object of the present invention to provide a method of molding a cast liquid polyurethane part such that the resulting part will be dimensionally stable (thermally elastic) during subsequent temperature variation. It is a further object of the present invention to provide such a permanently set liquid cast polyurethane part that requires minimum or substantially no machining after being cast and cured. Fulfillment of these objects and the presence and

DESCRIPTION OF THE PREFERRED EMBODIMENTS

The method of manufacturing a molded polyurethane product according to the present invention, how this process and the resulting product differ from prior art process and products and the advantage and benefits of the method can perhaps be best explained and understood by reference to the manufacture of a specific product. As such, the attached drawings illustrate the manufacturing of a polyurethane wear ring that is used as a seal between the impeller and external housing of a modern jet pump drive of a jet boat. Moreover, in describing the invention by making specific reference to the jet pump wear ring, it should be appreciated that the method and associated advantages according to the present invention are viewed as being generally applicable to other products and use applications and as such, the description should not be viewed as unduly limiting.

Figure 1:
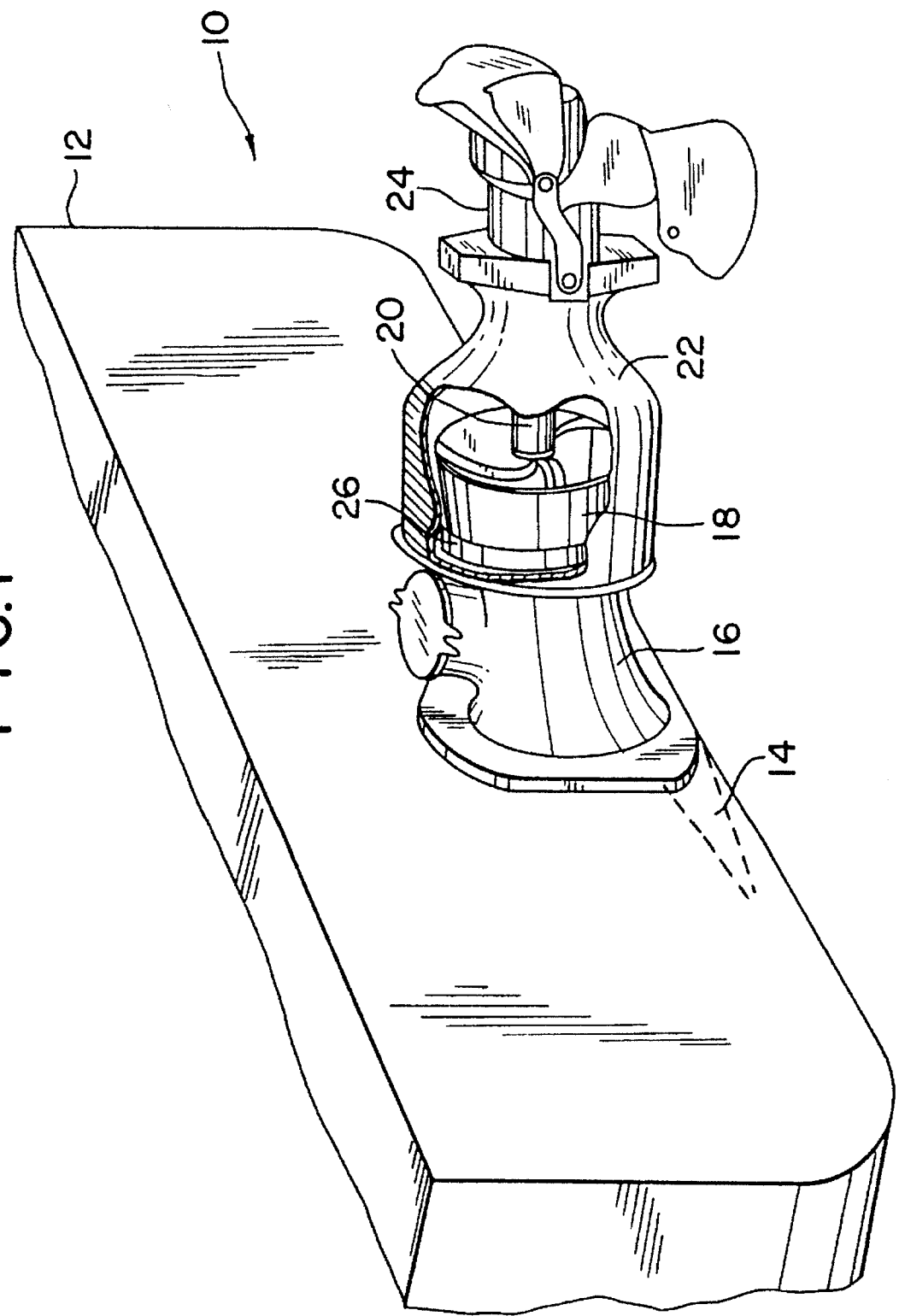
FIG. 1 illustrates a partial cut-away side view of a contemporary marine jet pump drive with the wearing ring according to the present invention.

FIG. 1 is a partial cut away view of a contemporary marine jet pump drive 10 attached to the stern of a jet boat 12. During operation of the jet boat, water enters the water inlet 14 and is directed through the main housing 16 to the inlet side of an internal impeller 18. The impeller 18 is driven by a central shaft 20 which in turn is driven typically by an automobile or marine engine (not shown) inboard the boat. Surrounding the impeller 18 is an impeller housing 22 which at the far end reduces in diameter prior to delivering the high pressure water jet to the articulated jet nozzle 24 that produces the thrust and control of the boat.

As further shown in FIG. 1, the impeller 18 consists of a central hub with radial blades projecting outward terminating in a frustoconical outer cylinder. The annular gap between the outside of the impeller 18 and the inside of the impeller housing 22 is partially occupied by a wear ring 26. Typically, this wear ring is made out of a wear resistant metal alloy such as brass or stainless steel with a plastic outer liner. The purpose of the wear ring is in part to seal the impeller such as to maximize the efficiency of the pump. In principle, the outlet side of the impeller represents an ultra high pressure region while the inlet side of the pump represents a low pressure region or suction. Thus, in the absence of any sealing action by the wear ring, reverse flow on the outside of the impeller within the annulus formed between the impeller and impeller housing will take place. This reverse flow represents a decrease in efficiency of the overall jet pump and a loss of performance of the boat. In actual practice, if sand or other abrasive material is present and reverse leakage past the wear ring takes place, the seal at the metal alloy wear ring will be further disrupted, frequently leading to the need to remove and replace the wear ring and the impeller. Because of this well recognized problem, the use of a wear resistant elastomer rubber ring has been proposed as an ideal substitute for the metal wear ring. However, two specific problems have been encountered when liquid cast polyurethane wear rings were used in jet pump applications. First, the liquid cast urethane rubber part could not be reproducibly cast to the desired dimensions with sufficient exacting tolerance to allow for reliable compressive insertion into the impeller housing. As such, the parts had to be cast oversize and then machined to the proper tolerance after being fully cured or physical retention by the use of set screws or the like were required. Both alternatives represent increase cost and maintenance problems. More importantly, the liquid cast urethane rubber parts even when fully cross-linked during curing would shrink after prolonged use and particularly after experiencing temperature transitions associated with changes in seasons. Literally, a polyurethane wear ring that was originally machined to compressively fit into the impeller housing would shrink and fall out after merely being stored over seasonal changes. Thus, prior to the present invention, it was the present inventors' experience that a polyurethane wear ring would after sufficient time contract and loosen up and ultimately be destroyed during use. In contrast to the characteristic behavior of the prior art polyurethane wear rings, the liquid cast urethane rubber according to the present invention possesses a permanent dimensional set that allows the wear ring to experience a broad range of operating temperatures and still remain dimensionally the same as when originally molded and cured. In further contrast, the method of inducing this permanent zero set allows a typical eight inch diameter wear ring for marine jet pump applications to be reliably manufactured to within a few thousands of an inch tolerance which eliminates any need for machining of the part.

Figure 2:
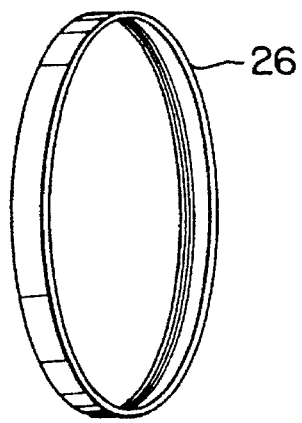
FIG. 2 is a perspective view of a typical wear ring according to the present invention.
Figure 3:
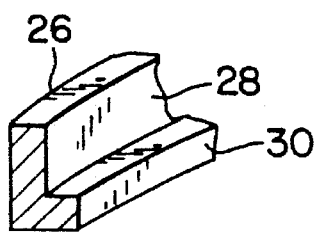
FIG. 3 is a close-up cross-sectional view of the wear ring of FIG. 2.

FIG. 2 illustrates a typical wear ring 26 for the above mentioned marine jet pump application manufactured according to the method of the present invention. Preferably, the ring will be about eight inches in diameter and will have an L-shaped cross-sectional geometry as illustrated in FIG. 3. The outer diameter of the final wear ring will be such that it compressively fits into the machined cavity at the far end of the main housing of the jet pump. This is essentially the same location as the original equipment metal rings that have been traditionally used in the marine industry. Since the urethane rubber wear ring is elastomeric and since a compressive stationary fit into the housing is desired, the liquid cast polyurethane part is intentionally manufactured to be slightly oversized. Typically, a contemporary 7.748 inch interior diameter machined surface of an impeller housing will be fitted with a 7.830 outer diameter polyurethane wear ring. This intentional oversizing will dictate a tight resilient installation.

Figure 4:
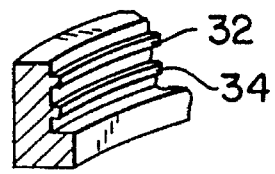
FIG. 4 is a close-up cross-sectional view of an alternate embodiment of the wear ring of FIG. 2 according to the present invention.

The longer portion 28 of the L-shaped cross-section, see FIG. 3, of the wear ring 26 occupies the annulus between the outside of the impeller and inside of the pump housing. Typically, up to 0.0125 of an inch radial clearance on each side is allowed between the spinning impeller and the wear ring. The shorter portion 30 of the L-shaped cross-section, again see FIG. 3, of the wear ring is smaller in diameter than the impeller and is preferably manufactured for zero gap. Thus, the shorter leg 30 of the L-shaped cross-section represents, during use, a thrust surface for sealing or preventing reverse liquid flow. As illustrated in the high performance alternate embodiment of FIG. 4, optional circumferential ridges 32 and 34 can advantageously be cast on the inner side of the long portion of the L-shaped cross-section. When using these circumferential ridges grooves are preferably machined in the impeller such that the ridges can not make contact with the spinning impeller. The circuitous path across these ridges during use further seals the unit, preventing loss of power and efficiency associated with reverse flow behind the impeller.

The actual method of manufacturing a polyurethane part according to the present invention involves first preparing an admixture of a viscous liquid urethane polymer and a curing agent as generally known in the art. This admixture is then poured or otherwise injected into a preheated mold having a cavity within the mold that is characteristic of the shape and size of the rubber component or part to be manufactured. The viscous liquid admixture remains in the heated mold until cured thus producing a molded polyurethane cast part, again as generally known in the art. The cast part is then removed from the mold and post cured at an elevated temperature for sufficient time to cross-link the rubber before being allowed to equilibrate to ambient conditions. It is this equilibrated liquid cast part that is then subjected to the novel setting steps of the present invention to produce a permanent dimensional set in the resulting urethane rubber. Preferably, a sustained period of equilibration of up to fourteen days is employed either before or after performing the set inducing process and before the part is put into service or use.

Figure 5:
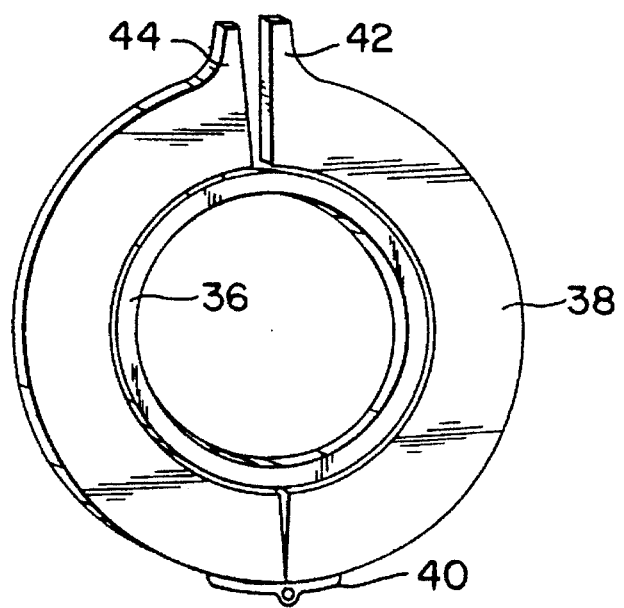
FIG. 5 is a perspective view of a wear ring of FIG. 2 and compression mold prior to the inducing of a low temperature set according to the present invention.

FIG. 5 illustrates a typical method of inducing the permanent dimensional set according to the present invention. As illustrated, a conventional liquid cast polyurethane wear ring 36 after being molded and allowed to equilibrate is placed in a compression mold 38. The compression mold, in this specific embodiment, is a split ring clamp 38 with hinge 40 at one end and compression tongs 40 and 42 at the other end and an interior diameter less than the exterior diameter of the unset liquid cast wear ring 36. It should be appreciated that the compression mold will vary according to the particular part to be set and the particular dimensions of that part. Thus, the size and shape of the compression mold can vary from various mechanical configurations to an isostatic pressure cell. In the illustrated embodiment of FIG. 5, the molded part 36 is placed in the circular or cylindrical clamp 38 and the clamp is then compressively held by forcing the tongs 42 and 44 together. In the compressed state, the mold 38 and part 36 are placed in an oven and heated to a temperature in excess of about 170° F. (preferably, 212° F.) and held at this elevated temperature for a sufficient time to allow the mold and part to come to a constant temperature (typically, an hour at 170° F. or preferably 45 minutes at 212° F.). The heated compression mold and part 36 are then removed from the oven and quenched to a temperature below 40° F. (preferably 32° F.) for a period of time sufficient to cool and permanently set the urethane rubber. One convenient method of quenching the product is to immerse the mold and compressed part in ice water for 5 to 10 minutes. The compression mold can then be removed and a dimensionally stable polyurethane part that exhibits the lack of thermal hysteresis over a broader range of temperature variations is recovered.

The liquid urethane polymer and curing agent useful in the present invention are any of the isocyanate terminated liquid casting rubbers and associated cross-linking curing agents, as generally known in the art, that generally cure to hard, tough products approaching the structural plastics in certain properties yet retaining some elastomeric nature. As such, the liquid polymer can be either a linear polymer, a chain extended or branched polymer as well as mixtures thereof. Various additives such as chain extenders, plasticizers, fillers and/or pigments can be present as generally known in the art. Similarly, various proportions of liquid urethanes can be employed to achieve desired reaction times, pot lives and physical properties. Preferably, the free isocyanate content of the liquid urethane polymer is selected such as to achieve significant cross-linking capacity. The cross-linking agent can be generally any polyfunctional amine, hydroxy compound, again as generally known in the art.

The following examples are presented to further illustrate the process according to the present invention and the resulting molded polyurethane part.

EXAMPLE I

Using an aluminum mold with aluminum spud, a series of polyurethane wear rings illustrated in FIGS. 1 and 3 were liquid cast molded. The viscous liquid urethane polymer employed was a 60/40 weight percent blend of two commercially available urethane polymers supplied by Uniroyal. The 60 weight percent component was an A95 durometer urethane sold under the tradename Vibrathene B-601 and the 40 weight percent component was a 75D durometer urethane sold under the trade name Adiprene L-315. Initially, the raw material was heated in an oven to 180° F. before being blended together at the desired weight ratio typically in aliquots of 2500 grams. The master batch was degassed by subjecting it to a 30 mm Hg vacuum for two to three minutes before being separated into smaller aliquots corresponding to individual specimens or molded parts (e.g., 130 grams or a multiple thereof). To these smaller aliquots was added half a weight percent carbon black supplied by Harwich Chemical under the trade name PEP05 and trace amounts of a silicone base degasser additive SAG 47 supplied by Union Carbide. The Smaller aliquots were then hand stirred and degassed before being placed back in the oven at 180° F. for final addition of the curing agent and pouring into the mold.

The curing agent was moca[4,4'-methylene-bis-(2-chloroaniline)] supplied by American Cyanamid. The amount of moca employed was 95 percent of the manufacturer's recommended theoretical stoichiometric amount, which in this case was 29.66 grams moca for each 130 gram aliquots of the 60/40 blend of liquid urethane polymer. The curing agent was initially melted, vacuum degassed and maintained in a liquid state in an oven at 240° F. Using protective gloves, molten moca was added to the hot aliquot of polymer blend and additives yielding a reactive polyurethane admixture with a pour life of about 1.5 minutes. The preheated aluminum mold with alumina spud coated with silicon based liquid release agent MR 515 from Chem-trend Corporation was then removed from a 212° F. oven and the reactive polyurethane admixture slowly poured into the mold cavity. The filled mold was placed back in the 212° F. oven to pre-cure for 15 minutes after which the polyurethane retained the nominal shape of the cavity of the liquid cast mold. After pre-cure, the liquid cast polyurethane wear ring was removed from the mold and stored at ambient conditions. The mold was then placed back into the 212° F. oven until used to cast the next part. The mold was recoated with release agent after every fourth or fifth part.

At the end of the day (eight hour shift), all liquid cast wear rings were placed in a 240° F. fan forced, post cure oven and left over night (i.e., 16 hours). The next day, the cured polyurethane wear rings were removed from the oven and allowed to equilibrate for 24 hours. The wear rings were then subjected to a forced set by placing them in an aluminum compression ring mold as illustrated in FIG. 5. The mold was clamped shut, compressing the wear ring, and then placed in a 212° F. oven for 45 minutes. At the end of this time and still under compression, the compression mold with wear ring was immersed in ice water, 32° F., for four minutes. The zero set wear ring was then removed from the compression mold and allowed to equilibrate at ambient conditions for at least 10 days. During this period, approximately a 1 percent dimensional change associated with moisture swelling occurred. Knowing that the internal diameter of the jet pump housing is 7.748 inches and the outer diameter of the impeller is 7.225 inches and that a 0.022 to 0.025 inch annular space is necessary for proper operation, the wear rings consistently exhibited a 7.830 inch "snug fit" outer diameter and a critical 7.250 inch diameter within a one to two thousands of an inch tolerance. Furthermore, a nominal 0.010 clearance to account for end play at the shorter leg of the L-shaped cross-section was readily achieved. No machining of the final parts were necessary to achieve the desired dimensions and tolerances.

Repeated temperature cycling of the wear ring installed in a test fixture of the dimension of the jet pump housing indicated that no further shrinkage was taking place, even though subfreezing temperatures were employed and the snug fit remained (returned) over the operating temperature range even after freezing.

EXAMPLE II

In a manner analogous to the above Example I, a series of liquid cast polyurethane wear rings having the high performance rib-rings as illustrated in FIG. 3 were molded by liquid casting and zero setting. The spud of the liquid cast mold was provided with two rib-rings 0.100 inch wide and 0.030 inch deep such as to fit into two grooves 0.126 inch wide and 0.035 inch deep machined in the outer perimeter of the impeller. The inner diameter of the top ledge of the rib-rings were consistently molded to 7.226 inches consistent with insertion into the 7.225 inch outer diameter of the impeller. A zero clearance at the thrust surface (shorter leg of the L-shaped cross-section) was consistently achieved. Again, no post molding/curing machining was necessary, yet tolerances of one thousandths of an inch were maintained.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

We claim:

1. A method of manufacturing a molded polyurethane part exhibiting dimensional stability to temperature fluctuations comprising the steps of:

(a) preparing an admixture of a viscous liquid urethane polymer and a curing agent;

(b) casting the admixture prepared in step (a) into a first preheated mold and maintaining therein until said admixture is cured thus producing a molded polyurethane cast part;

(c) removing said cast part produced in step (b) from the mold and subjecting said cast part to a temperature in excess of about 212° F. for a time sufficient to post cure said cast part before allowing said cast part to equilibrate to ambient conditions;

(d) compressing said cast part produced in step (c) in a second mold;

(e) heating the compressed cast part and second mold of step (d) to an elevated temperature for sufficient time to have said cast part and second mold thermally equilibrate at the elevated temperature;

(f) cooling said compressed cast part and second mold produced in step (e) to a low temperature for a time sufficient to induce a permanent set in the cast part; and (g) removing from the second mold a cast polyurethane part that exhibits improved dimensional stability during repeated temperature fluctuations.

2. A method of manufacturing a molded polyurethane part according to claim 1 wherein the dimension of the first preheated mold for casting the polyurethane part is oversized relative to the final desired dimension of the final part and wherein the second mold for compressing the cast part is under size relative to the final desired dimension of the part.

3. A method of manufacturing a molded polyurethane part according to claim 1 wherein the temperature to which the compressed cast part and second mold is heated is at least above 170° F. and the temperature to which the compressed cast part and second mold is cooled is at least below 40° F.

4. A method of manufacturing a molded polyurethane part according to claim 2 wherein the temperature to which the compressed cast part and second mold is heated is at least above 170° F. and the temperature to which the compressed cast part and second mold is cooled is at least below 40° F.

5. A method of manufacturing a molded polyurethane part according to claim 1 wherein the heating of the compressed cast part and second mold is at a temperature of about 212° F. for about 45 minutes and the cooling of the compressed cast part and second mold is at a temperature of about 32° F. for about 5 minutes.

6. A method of manufacturing a molded polyurethane part according to claim 2 wherein the heating of the compressed cast part and second mold is at a temperature of about 212° F. for about 45 minutes and the cooling of the compressed cast part and second mold is at a temperature of about 32° F. for about 5 minutes.

* * * * *